United States Patent [19]

Leach

[11] Patent Number: 4,513,857

[45] Date of Patent: Apr. 30, 1985

[54] CONVEYOR LINKAGE

[76] Inventor: John M. Leach, P.O. Box 341, Port Jefferson, N.Y. 11777

[21] Appl. No.: 404,767

[22] Filed: Aug. 4, 1982

[51] Int. Cl.³ .............................................. B65G 19/14
[52] U.S. Cl. .................................... 198/716; 198/733; 403/131
[58] Field of Search ....................... 198/716, 731, 733; 403/122, 128, 131

[56] References Cited

U.S. PATENT DOCUMENTS

| | | | |
|---|---|---|---|
| 499,525 | 6/1893 | Dodge | 198/733 |
| 499,526 | 6/1893 | Dodge | 198/733 |
| 3,216,553 | 11/1965 | Leach | 198/716 X |
| 3,300,303 | 1/1967 | Leach | 419/8 |

Primary Examiner—Joseph E. Valenza
Assistant Examiner—David A. Bucci

[57] ABSTRACT

This invention comprises a conveyor chain linkage which is especially well adapted for tubular type bulk handling conveyors wherein it is very important that the linkage be very strong but take up as little space as possible in order not to diminish the volumetric capacity of the conveyor and also be very accurate in pitch dimensions so as to operate properly on the sprocket which drives the chain. Structurally the preferred form of the invention comprises a rod, each end of which has a slightly increased diameter area which is threaded and a ball having a central opening threaded to fit onto a threaded area and a ball so threaded on each end of the rod.

1 Claim, 4 Drawing Figures

CONVEYOR LINKAGE

BACKGROUND OF THE INVENTION

Conveyors of the type in which linkages of the general type of this invention are disclosed in U.S. Pat. No. 3,216,553. The linkages disclosed in this patent were formed by forging or maching the balls and rod from one piece of steel or joining separate balls to a rod by welding, brazing or swedging the rod ends into the balls, or by powdered metal forming as disclosed in U.S. Pat. No. 3,300,303.

The integral machining was found to be very expensive, the forging created linkages which were very inaccurate in pitch and also increased the rod diameter a large amount which decreased the volumetric capacity of the conveyor an undesirable amount, the swedging had to be done before the rods were heat treated because the hardened metal could not be swedged after heat treating without cracking.

In addition, all of these forming procedures did not produce linkages having the maximum tensile strength specified for the type of steel used even after heat treating as required by the steel manufacturer.

After much experimenting, testing and study it was found that it was impossible to heat treat a finished linkage in which where the balls and linkage and been assembled before heat treating because the relatively large mass of a ball around the section of a rod embedded therein shielded the embedded rod section from the effect of the heat treating, particularly in the quenching operation, which caused the rod to always break in the embedded area before the specified tensil strength for the rod had been reached, sometimes as much as by fifty percent.

It was, of course, not possible to weld or braze the balls and rod together after heat treating because the high heat at once destroyed the strength gained by the heat treating.

It was then attempted to achieve the desired tensile strength for the linkages by threading each end of a rod, drilling a central hole in each ball and threading the ball holes to match the rod threads, heat treating the balls and rods separately and attaching the balls and rods after heat treating.

This also failed because the rods always broke in the threaded areas well before the desired tensile strength was reached.

SUMMARY OF THE INVENTION

After much further experimenting, testing and study it was found that a linkage having the desired ultimate tensile strength can be formed as follows:

1. Increase the diameter of the rod on each end in the areas which will be covered by the balls.
2. Thread each of these areas.
3. Drill each of the balls and thread the openings to match the rod threads.
4. Heat treat the rods and balls separately.
5. Screw the balls on the threaded ends of the rods.
6. Make certain that the increased diameter of the rod ends as specified in step 1. is such that the root diameter of the threads selected for the rods is at least thirty percent larger than the diameter of the free area of the rods not covered by the balls.
7. Make certain that the step formed between the exterior of the free area of the rods and the junction of the exterior of the balls and the enlarged areas of the rods is shaped so as to form an extension of the exterior of the balls.

Linkages so formed will consistently have the ultimate tensile strength specified for the steel used.

Other objects and advantages of this invention will be apparent to those skilled in the art after recourse to the following drawings and specification of the now preferred invention form.

DESCRIPTION OF THE NOW PREFERRED EMBODIMENT OF THE PRESENT INVENTION

Figure 1:
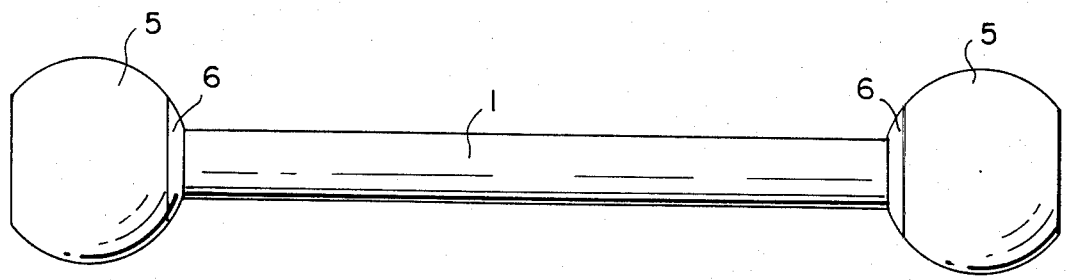
FIG. 1 is a view of the linkage of the present invention.
Figure 2:
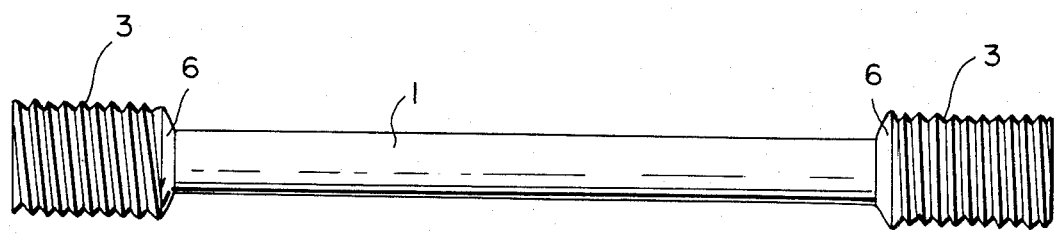
FIG. 2 is a view of a rod of a linkage without the end balls.
Figure 3:
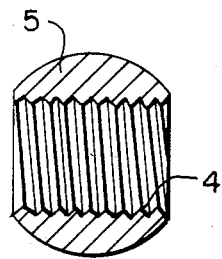
FIG. 3 is a central cross sectional view of a ball without the rod.
Figure 4:
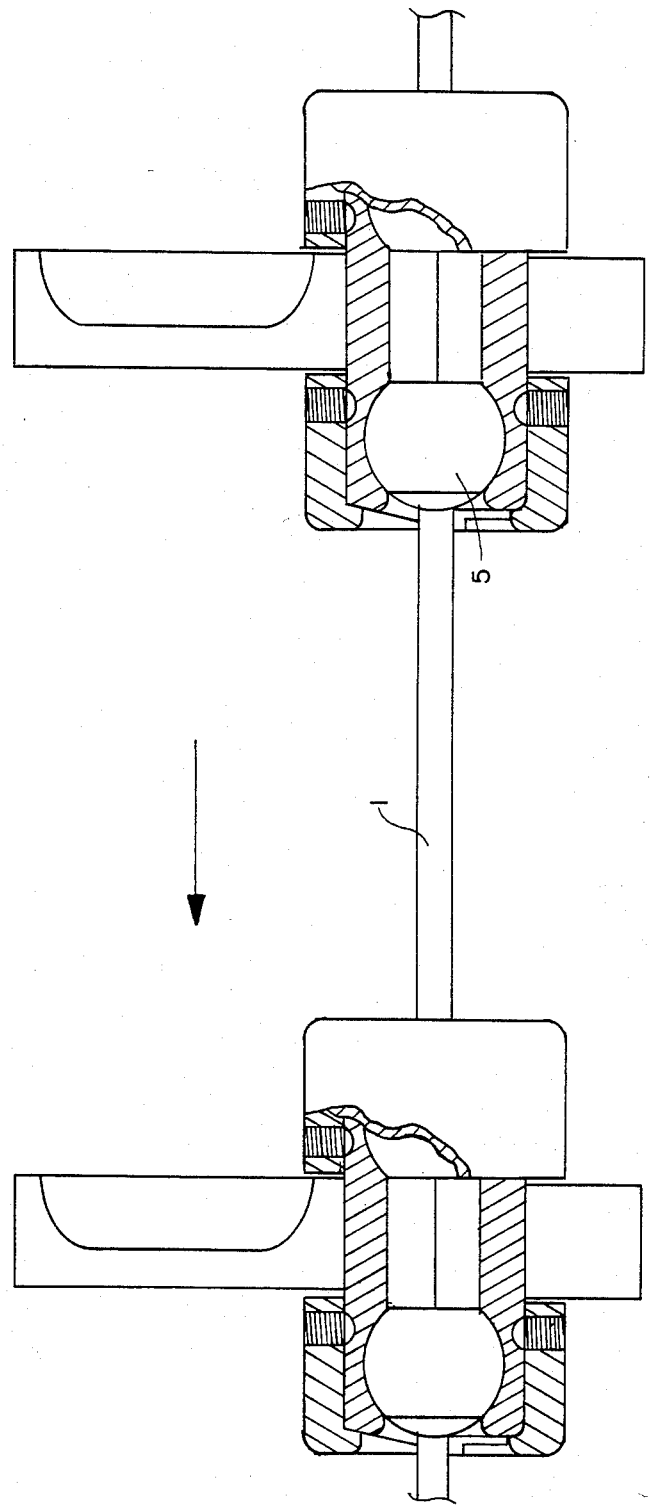
FIG. 4 is a partly cross-sectional view of a conveyor chain into which a linkage of the present invention has been assembled.

The linkage of the present invention comprises a steel rod 1 provided on each end with a threaded, diametrically enlarged area 3 on each end. A ball 5 provided with a threaded opening 4 is screwed onto the enlarged area 3 on each end of the rod 1. The threaded area 3 on each end of the rod 1 is coextensive with the threaded area 4 in the ball 5. The balls 5 are usually formed of steel but any other desired material may be used. The same applies to the rod 1.

When the rods 1 and the balls 5 are made of heat treatable materials they will usually be separately heat treated in accordance with the specifications of the materials manufacturers to produce the maximum strengths obtainable.

The difference in diameters of the free portion of the rod 1 and the enlarged diameter of the threaded areas 3 is preferably selected so that root diameter of the thread selected for the areas 3 will be thirty percent greater than the free rod diameter. This will prevent the sharp thread roots from acting as incipient cracks in the material in the center of the enlarged areas 3 so that the centers of the enlarged area 3 will be at least equally as strong in tensil strength as the free rod 1 after heat treating.

The step or shoulder between the exterior of the free portion of rod 1 and the end of the enlarged area 3 is rounded off so as to be a truncated section of the spherical ball 5 as shown at 6. This prevents the shoulder which would otherwise be at that point from going solid against the socket which the balls 5 fit into during use (not shown) and thus restricting the full angular movement of the linkage.

As an example of the extreme utility of this invention and not in any way a limitation thereof, when linkages using a CR C1040 steel rod having a seven sixteenth inch diameter at the free area were formed as just described and heat treated according to manfacturer's specifications, the ultimate tensile strength was always 36,000 pounds. Whereas, when rods were formed out of the same materials but as described in the "BACKGROUND OF THE INVENTION", supra, the strongest rod broke at 19,546 pounds, or almost one half of the strength of the linkages formed as in the present invention. This much increased strength of the linkages of the present invention tremendously extends the field of application for conveyors using the linkages of this invention, thus at no additional production cost the linkages of this invention actually doubles the sales potential for the coneyors so equipped.

The foregoing specification is explanatory and not limitative of this invention as changes and modifications may be made in the preferred embodiment of the invention disclosed without exceeding the scope of the invention.

The invention having been disclosed, the claims predicated thereon are as follows:

I claim:

1. In a bulk material handling conveyor of the type in which bulk material is moved through a casing by flights each formed of a pusher disc suitably supported on a carrier having a ball socket on each side of each disc to receive one ball of a linkage having a ball on each end interconnected by a rod to form a universal joint between each rod end and each flight to thus form an extra flexible chain which can be driven through the casing by a suitable drive, the improvement which comprises a conveyor linkage as aforesaid including a steel rod the material of which has been heat treated independently of any other elements as specified by the steel manufacture to increase its tensile strength to the maximum, a diametrically enlarged threaded area on each end of the rod leaving an unthreaded part of the rod in between, two balls as aforesaid, both of which have been heat treated separately from the rod and each having a centrally positioned opening therein threaded to fit a threaded area on the rod and one of the balls threaded on each of the threaded areas of the rod, the rod threaded areas having root diameters of the threads at least thirty percent larger than the diameter of the unthreaded part of the rod, thus providing a linkage having uniform maximum tensile strength throughout its total length even when the tension is applied to the linkage through the ball and rod connection, and further characterized in that the terminus of each threaded part of the rod nearest to the unthreaded part of the rod is rounded off to form an extension of the spherical surface of the ball threaded upon it and thus eliminating a potential catch point for the edge of the ball socket.

* * * * *